United States Patent
Björk et al.

(10) Patent No.: US 9,135,572 B2
(45) Date of Patent: Sep. 15, 2015

(54) METHOD AND ARRANGEMENT FOR PROCESSING DATA

(75) Inventors: Jonas Björk, Stockholm (SE); Carl-Fredrik Sundlöf, Danderyd (SE); Simon Moritz, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 273 days.

(21) Appl. No.: 13/822,839

(22) PCT Filed: Sep. 29, 2010

(86) PCT No.: PCT/SE2010/051045
§ 371 (c)(1),
(2), (4) Date: Mar. 13, 2013

(87) PCT Pub. No.: WO2012/044214
PCT Pub. Date: Apr. 5, 2012

(65) Prior Publication Data
US 2013/0173509 A1 Jul. 4, 2013

(51) Int. Cl.
*G06F 15/18* (2006.01)
*G06N 99/00* (2010.01)
*G06K 9/62* (2006.01)

(52) U.S. Cl.
CPC ............... *G06N 99/005* (2013.01); *G06F 15/18* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 6,076,151 A * | 6/2000 | Meier | 711/171 |
| 6,119,112 A | 9/2000 | Bush | |
| 6,301,575 B1 * | 10/2001 | Chadha et al. | 707/999.002 |
| 6,347,310 B1 | 2/2002 | Passera | |
| 2006/0117000 A1 * | 6/2006 | Lulu | 707/4 |
| 2007/0156617 A1 * | 7/2007 | Szummer et al. | 706/20 |

OTHER PUBLICATIONS

International Search Report, PCT Application No. PCT/SE2010/051045, Jun. 15, 2011.
Written Opinion of the International Searching Authority, PCT Application No. PCT/SE2010/051045, Jun. 15, 2011.
Ng et al., "An Evaluation of Progressive Sampling for Imbalanced Data Sets", *2006 Proceedings of the Sixth IEEE International Conference on Data Mining—Workshops* (ICDMW, 2006), Dec. 2006, pp. 657-661.
Ordonez: "Building Statistical Models and Scoring with UDFs," SIGMOD'07, Jun. 12-14, 2007, Beijing, China; pp. 1005-1016.

(Continued)

*Primary Examiner* — Kakali Chaki
*Assistant Examiner* — Luis Sitiriche
(74) *Attorney, Agent, or Firm* — Myers Bigel Sibley & Sajovec, P.A.

(57) ABSTRACT

A method and arrangement for processing data when training a data model involving multiple iterations of data records in a dataset (400c, 606) stored in a database (400, 600). Memory space (400d, 608) is allocated in the database for maintaining the data model during the training operation. The data records in the dataset are read (4:3) directly from the database for each iteration, and the data model is trained (4:4) inside the database by repeatedly applying the read data records in the training operation and updating (4:5) the data model. It is also checked (4:6) whether the updated data model has converged according to a predefined convergence condition. The data model is eventually saved (4:7) once the data model has converged.

20 Claims, 4 Drawing Sheets

(56) References Cited

OTHER PUBLICATIONS

Sarawagi et al: "Integrating Association Rule Mining with Relational Database Systems: Alternatives and Implications," Newsletter ACM SIGMOD Record, vol. 27, Issue 2, Jun. 1998, New York, NY, pp. 343-354.
Ordonez: "Integrating K-Means Clustering with a Relational DBMS Using SQL," IEEE Transactions on Knowledge and Data Engineering, Vol. 18, No. 2, Feb. 2006, pp. 188-201.
Cohen et al: "MAD Skills: New Analysis Practices for Big Data," *Proceedings of the VLDB Endowment* 2.2 (2009): 1481-1492.
Ordonez et al: "Vector and Matrix Operations Programmed with UDFs in a Relational DBMS," *Proceedings of the 15th ACM international conference on Information and knowledge management.* ACM, Nov. 2006, pp. 503-512.
Anderson: "The Long Tail" Wired magazine, Issue 12.10, Oct. 2004, 6 pages. Retrieved from the internet: http://archive.wired.com/wired/archive/12.10/tail.html.
Silberschatz et al., "Database System Concepts," Sixth Edition, McGraw-Hill Companies, Inc., 2011; Table of Contents, Chapter 1 (pp. 1-35) and Chapter 16 (pp. 721-766), including pp. 9, 724 and 740.
Chen et al., "Scaling-Up and Speeding-Up Video Analytics Inside Database Engine," DEXA '09: Proceedings of the $20^{th}$ International Conference on Database and Expert Systems Applications, Linz, Austria, Aug. 31-Sep. 4, 2009.

\* cited by examiner

METHOD AND ARRANGEMENT FOR PROCESSING DATA

CROSS REFERENCE TO RELATED APPLICATION

This application is a 35 U.S.C. §371 national stage application of PCT International Application No. PCT/SE2010/051045, filed on Sep. 29, 2010, the disclosure and content of which is incorporated by reference herein in its entirety. The above-referenced PCT International Application was published in the English language as International Publication No. WO 2012/044214 A1 on Apr. 5, 2012.

TECHNICAL FIELD

The invention relates generally to a method and arrangement for processing data stored in a database by training a data model in support of a machine learning procedure.

BACKGROUND

Today, large amounts of information on customers, subscribers and consumers are maintained in databases which can be retrieved for different purposes, e.g. for creating and offering relevant and attractive services that have been adapted to different needs and preferences of those customers. In order to understand the customers' needs and preferences, their behavior can be studied by employing a process known as "machine learning" on stored data relating to various activities of the customers. This analysis work can thus be executed based on traffic data generated in communication networks, which is typically stored in huge databases as Call Detail Records (CDR) relating to executed calls and sessions.

The traffic data may refer to voice calls, SMS (Short Message Service), MMS (Multimedia Message Service), downloading sessions, e-mails, web games, etc. This type of information can be used to analyze the customers' behavioral characteristics in terms of communication habits and service usage, and Machine Learning Algorithms (MLA:s) can be used for processing the traffic data. A Data Mining Engine (DME) may further be employed that collects traffic data and extracts information therefrom using various data mining and machine learning algorithms.

FIG. 1 illustrates an example of how data mining and machine learning algorithms can be employed for a communication network, according to the prior art. A DME 100 typically uses various MLA:s 100*a* for processing traffic data TD provided from a database 102, and further to identify segments or clusters with customers having similar characteristics. The database 102 collects traffic data from the network and the DME 100 uses the traffic data TD as input data to one or more MLA:s 100*a*. After processing the traffic data, the DME 100 provides the resulting segment information as output data to various service providers 104 to enable adapted services and targeted marketing activities. Machine learning procedures with model training are also often used for stored data relating to a range of application fields, such as transactions at a company or enterprise, research study results, analysis of users, natural language processing, pattern recognition, search engines, fraud detection, and so forth.

The machine learning algorithms known today are usually configured to create a model of the stored data by employing iterative computation of records in a dataset to derive different characteristics of interest from the stored data having some unknown underlying probability distribution. In a typical machine learning process, the data model is thus "trained" in order to reflect complex patterns inherent in the stored data. In this process, a so-called "back-end application" or similar is often used having functionality for fetching raw data from the database and training the model by applying the raw data to the model multiple times in an iterative manner.

This means that the raw data is applied to the model over and over again until the model has "converged" in some sense, wherein the model is updated after each iteration to minimize or at least reduce the divergence or difference between the raw data and the model. When this divergence has stabilized, i.e. does not notably change any more upon further iterations, the model is said to be converged and is stored as processed data. For example, the well-known "K-means clustering algorithm" can be employed where a squared error function is minimized.

By way of example, k initial "means" are first randomly selected from the dataset. Then, iteratively, k clusters are created by associating every observation from the data set with the nearest mean, and the "means" are updated by setting them equal to a centroid of each of the k clusters. This is then repeated with multiple iterations over the dataset, and in each iteration the "means" change their position step by step until no more noteworthy changes occur and then the model is deemed to have converged.

However, there are some serious drawbacks with using a back-end application in the above manner, particularly when a very large dataset with many data records is involved. Firstly, the fetching operation can be quite time-consuming e.g. depending on limited bandwidth of the communication link used. In some cases, there may be millions of records in a dataset and it may be necessary to train the model hundreds of times before it is reasonably converged, each time fetching all the records from the database.

FIG. 2 illustrates that a back-end application 200 repeatedly fetches the same dataset from a database 202 in an action 2:1, in order to train a data model iteratively in an action 2:2, using a model training function 200*a*, thus repeating actions 2:1 and 2:2 multiple times which can be very tedious. A suitable query language is used for the fetching operation, typically the well-known query language SQL (Structured Query Language) which is a database computer language designed for managing data in relational database management systems.

On the other hand, the fetching operation can be significantly rationalized by fetching the data only once and store all records locally in the back-end application for use in the training process. FIG. 3 illustrates an example of this, where a back-end application 300 fetches the dataset only once from a database 302 in an action 3:1 and stores the records in a local memory 300*a*. A data model is then trained in an action 3:2, using a model training function 300*b* that reads the records from memory 300*a* for each iteration, which is much less time-consuming than fetching the records repeatedly for each iteration from database 302. However, this solution typically requires a memory with capacity for storing large datasets and the records therein must still be fetched from the database 302, if only just once.

It is thus a problem that a back-end application for training a data model in a machine learning process is either required to fetch large amounts of data records multiple times, or must be equipped with a memory of great storing capacity. Conventional back-end applications for machine learning are equipped with a RAM (Random Access Memory) for temporary storage of data. The large amounts of data for machine learning do mostly not fit into a RAM and it may therefore be possible only to take a limited amount of samples from the dataset that can be accommodated in the RAM for the training operation, naturally resulting in lost information and insufficient accuracy. This becomes a problem in machine learning where it is necessary to iterate over the entire dataset in order to achieve adequate model training.

SUMMARY

It is an object of the invention to address at least some of the problems outlined above. It is also an object to obtain a database solution that can be used for efficient machine learning and model training operations without requiring as much capacity and/or time as in the conventional solutions outlined above. It is possible to achieve these objects and others by using a method and an arrangement as defined in the attached independent claims.

According to one aspect, a method is provided for processing data when training a data model involving multiple iterations of data records in a dataset stored in a database. In this method, memory space is allocated in the database for maintaining the data model during the training operation. The model training includes reading the data records in the dataset directly from the database for each iteration and training the data model inside the database by repeatedly applying the read data records in the training operation and updating the data model in the allocated memory accordingly. It is also repeatedly checked whether the updated data model has converged according to a predefined convergence condition, and the data model is eventually saved once the data model has converged.

According to another aspect, an arrangement is provided that is configured to process data when training a data model. This arrangement comprises a first logic unit adapted to allocate memory space in the database for maintaining the data model during the training operation when the data model is trained by multiple iterations of data records in a dataset stored in the database.

The first logic unit is also adapted to read the data records in the dataset directly from the database for each iteration and train the data model inside the database by repeatedly applying the read data records in the training operation, and to update the data model in the memory accordingly. The arrangement further comprises a second logic unit adapted to check whether the updated data model has converged according to a predefined convergence condition. The first logic unit is further adapted to save the data model once the data model has converged.

The above method and arrangement may be configured and implemented according to different optional embodiments. In some embodiments, the data model is updated in the memory after applying a predetermined number of data records in the training operation according to a preset updating scheme, or after applying substantially all data records in the total dataset in the training operation. It may then also be checked whether the updated data model has converged after each updating of the data model in said memory.

The training operation may be triggered when an SQL query or command is received from a computer outside the database. Further, the memory space may be dynamically allocated to accommodate different versions of the data model of varying size, or allocated in advance with fixed size.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
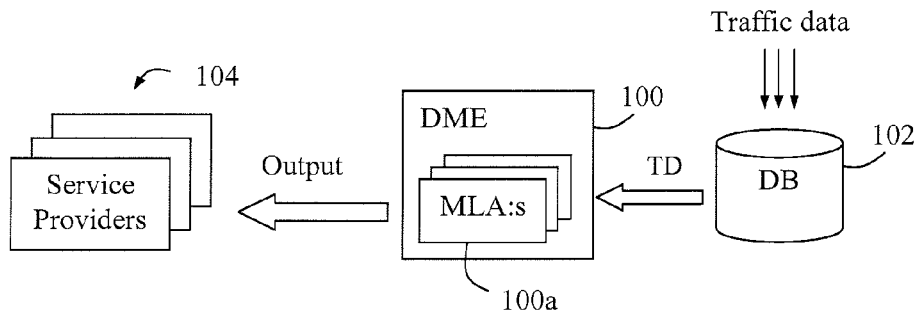
FIG. 1 illustrates a conventional procedure for using data mining, according to the prior art.

Briefly described, a solution is provided to enable training of a data model involving multiple iterations of records in a dataset stored in a database, with improved efficiency, e.g. in terms of saved time and reduced memory capacity. In this solution, memory space is allocated in the database which is used for storing the model after each iteration of the dataset. This memory may be a RAM or similar and can be of substantially less capacity or size than the memory 300a in the example of FIG. 3 since a data model is typically much "smaller" than a complete dataset.

A sufficient fixed amount of memory space may be allocated initially in preparation for the model training, or the memory space may be allocated dynamically, i.e. as needed after each iteration when the model is updated. During the training process, the data records are read directly from the database, which is a much faster operation as compared to fetching the records to a external application, and the model is trained by means of the read records by a training function likewise configured inside the database.

Each time the records in the total dataset have been iterated, the model can be updated and saved in the allocated memory. Alternatively, the model can be updated in the allocated memory after applying each record or after applying a predetermined number of records, and the invention is not limited to any particular point of updating the model during the training process. It can be generally said that the data model is updated according to a preset updating scheme. After each iteration of the dataset, it is checked in the memory whether the current model has converged or not. If not, further iterations of the dataset are executed until eventually the model is deemed to be converged.

The converged model is then finally saved, e.g. by writing it to the database as processed data or by storing it in any suitable data storage or memory outside or inside the database. It should be noted that this novel procedure can be executed much faster as compared to fetching the dataset to an external application, and the memory for storing updated versions of the data model can be much smaller than what is required for holding a complete dataset in practice, in particular when very large datasets are involved.

In this description, the term "converged" is used to indicate that the data model is deemed to be sufficiently accurate and truthful according to some predefined convergence condition, e.g. when a calculated mean squared error has stabilized or the divergence between the data records and the model has reached a predefined threshold or the like, implying that no further iterations over the dataset are required. However, any rules or thresholds may be used for defining this condition and the invention is not limited to any particular convergence condition.

In one possible implementation, a first logic unit is configured inside the database and operates to read the records of a dataset directly from a table or the like in the database, and to train the model by means of the read records. The first logic unit is capable of executing one iteration or training cycle at a time. The first logic unit then provides the resulting model to a second logic unit, e.g. by returning a memory address which the second logic unit can access to check the model being stored according to the memory address. If the model has not converged, the second logic unit triggers the first logic unit to execute one or more further iterations and update the data model accordingly. Once the model has converged, the second logic unit triggers the first logic unit to save the converged model, e.g. to write the converged data model to the database as processed data or to save it in any other suitable manner, depending on the implementation.

Some work has already been done to generally integrate computations within a database. Database vendors have recently made it possible to use so-called "User-Defined Functions" (UDF), which is basically a subroutine programmed in a high-level programming language, e.g. C or C++. The UDFs are further compiled to object code for execution inside the database. In the solution described herein, the UDF technique can be utilised for training the data model. In one possible implementation of the present solution, the above first logic unit is comprised of one or more UDFs capable of executing one iteration of the entire dataset at a time when training the data model.

Figure 4:
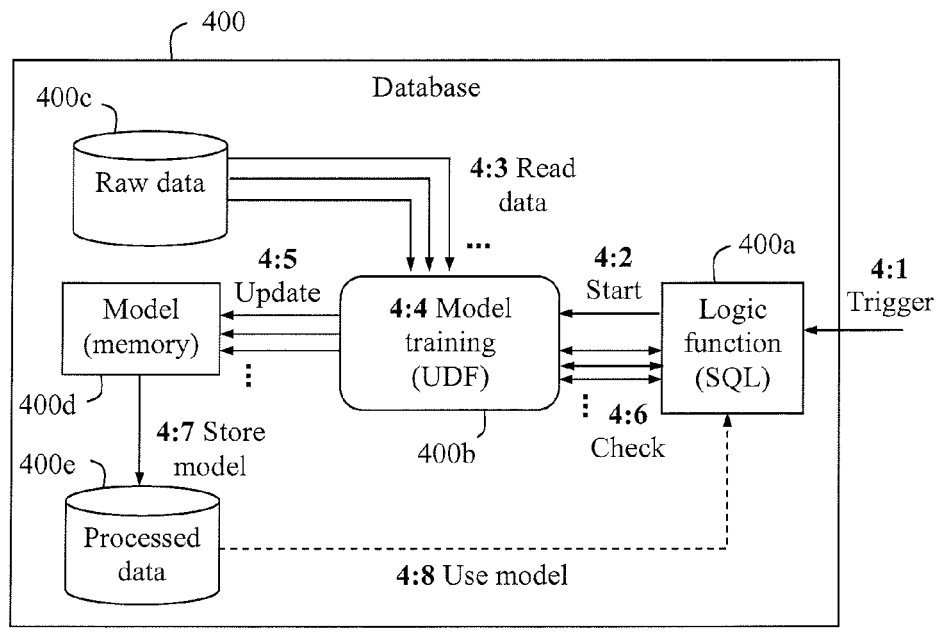
FIG. 4 is a schematic block diagram illustrating a procedure for processing data when training a data model, according to one possible embodiment.

A non-limiting example of using this solution within a database for processing data when training a data model in a machine learning operation, will now be described with reference to FIG. 4, illustrating schematically a database 400 in which the solution is implemented. It is assumed that the training process involves multiple iterations of data records in a dataset stored in the database 400, i.e. the records are used more than once. In some practical cases, hundreds of iterations over a dataset with millions of records may be required before the data model is deemed to be converged, although the invention is not limited to any particular amount of iterations and/or data records. The dataset is thus stored in the database as "raw data" 400c, i.e. not yet processed data, which may, without limitation, refer to communication sessions, money transactions, search parameters, etc., depending on the field of use.

A first action 4:1 illustrates that a schematic logic function 400a inside the database 400 receives some kind of trigger or request for starting the model training process. The logic function 400a may use SQL as a database query language and the trigger may be sent in the form of a database query or command from a user-operated computer, not shown, outside the database. The logic function 400a then accordingly activates or invokes a model training function 400b, being likewise implemented inside the database 400, to start the actual model training process, in a next action 4:2. In this solution, it is possible to implement the model training function 400b in a UDF that is capable of iterating once over the dataset at a time and accordingly updating the data model, although the invention is not limited thereto.

Similar to any conventional machine learning operations, the model training process requires multiple iterations over the data records in the dataset, i.e. the raw data 400c, when training the data model using some appropriate computation algorithm that has been selected depending on the field of use. Although not shown as a distinct action in this figure, this procedure includes allocation of memory space 400d in the database 400 for storing and maintaining the actual data model during the training operation, which typically requires much less memory space than the dataset 400c. Therefore, the allocated memory 400c may be a conventional RAM or any other useful type of memory, which can be relatively small-sized.

In a further shown action 4:3, records in the dataset are read from the raw data 400c in the database. It should be noted that reading data inside a database is generally a much faster operation than fetching the same data from the database 400 to an entity outside the database, thus rendering action 4:3 less time-consuming than action 2:1 in the prior art example of FIG. 2. A next action 4:4 illustrates that the model training function 400b applies the read data in an iterative manner for training the model.

After iterating over the read data, the model training function 400b updates and stores the trained data model in memory 400d. A further action 4:5 thus illustrates that the data model in memory 400d is updated after each training cycle, which may be set to any length ranging from iterating over just one data record to iterating over all data records in the entire dataset. In this update operation, the latest model version replaces a previous model version in memory 400d, e.g. according to a preset updating scheme. As mentioned above, the memory 400d may be repeatedly and dynamically allocated for each update to accommodate the latest model version, or may be allocated with a fixed size before starting the training process.

Further, the logic function 400a checks whether the data model has converged according to a predefined convergence condition, as schematically illustrated by an action 4:6. The convergence check may be performed at certain intervals such as after each iteration of the entire dataset, after each iteration of a preset number of data records, and/or after each model update. Thus, actions 4:3-4:6 represents the repeated operations of reading the dataset records, training and updating the data model, and checking the trained data model, which are executed multiple times in an iterative manner until it is determined in the checking action 4:6 that the data model has eventually converged by fulfilling the convergence condition. Finally, the converged data model is saved in a suitable storage inside or outside the database 400, in a final shown action 4:7. In this example, the converged data model is written to a data storage or memory 400e within the database 400, although any useful memory or storage may be employed in this action.

Figure 2:
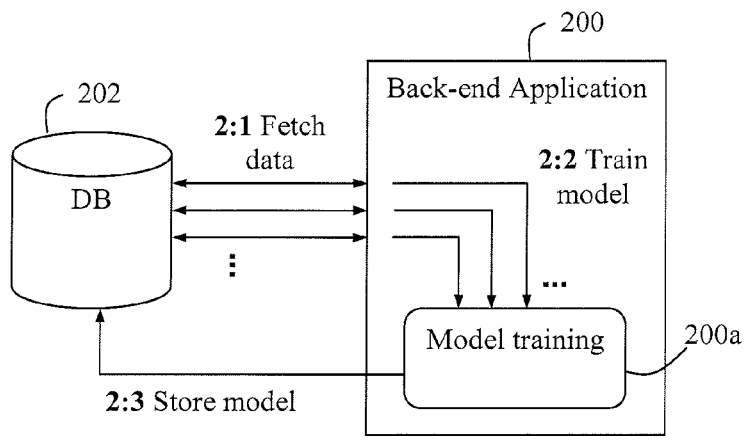
FIG. 2 is a block diagram illustrating a first example of model training, according to the prior art.
Figure 3:
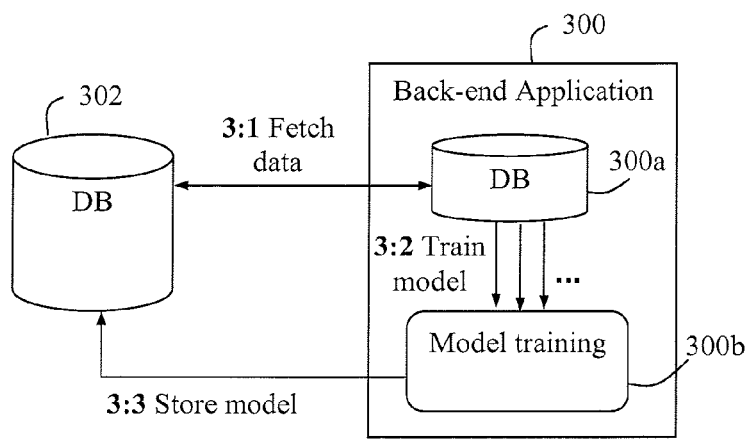
FIG. 3 is a block diagram illustrating a second example of model training, according to the prior art.

Advantages associated with the above-described solution of reading data records and iterating over the dataset for model training inside the database 400, include a faster and more effective process that does not require great storage capacity outside the database, e.g. as compared to the prior art solutions of FIGS. 2 and 3. The different actions and operations outlined above for FIG. 4 can be implemented in different optional ways, some of which will be described in more detail later below.

Figure 5:
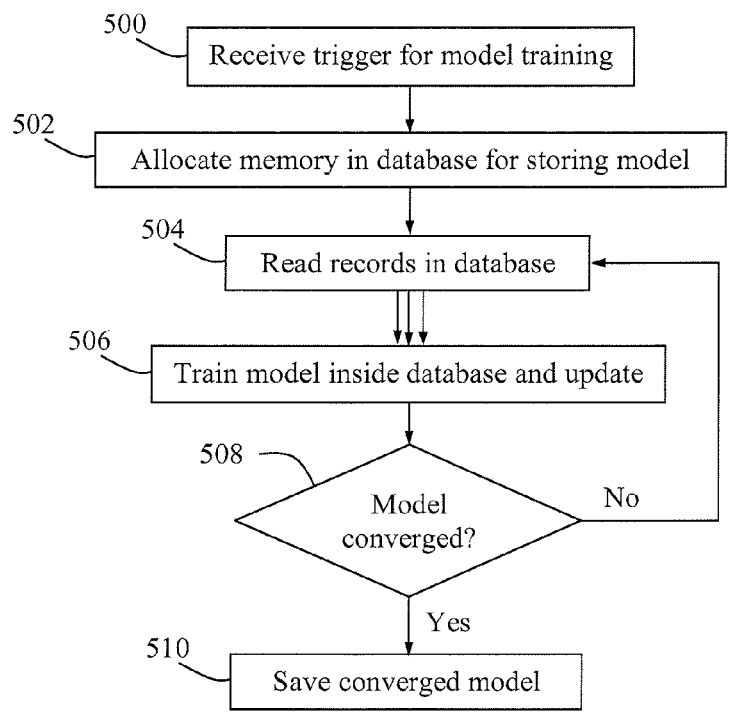
FIG. 5 is a flow chart with actions performed by a function in a database for processing data when training a data model, according to further possible embodiments.

A procedure for processing data when training a data model, involving multiple iterations of data records in a dataset stored in a database, will now be described with reference to actions in the flow chart in FIG. 5. This procedure can basically be executed by one or more logic functions or units within the database, which will be described by means of examples further below. In a first action 500, a trigger or request for model training is received, e.g. as a query or command from an outside computer, basically corresponding to action 4:1 above. A next action 502 illustrates that memory space is allocated in the database for maintaining the data model during the training operation.

Then, the actual training operation can be executed in an iterative manner, e.g. as described above. A further action 504 illustrates that the data records in the dataset are read directly from the database for each iteration, which may extend over a training cycle of predetermined length, e.g. a preset number of data records or the total dataset. Action 504 basically corresponds to action 4:3 in FIG. 4. In a further action 506, the data model is trained inside the database by means of the read data record(s) and the data model is updated in the allocated memory accordingly, basically corresponding to actions 4:4 and 4:5 in FIG. 4. The actual training may thus be performed continuously for each read data record or at regular intervals after reading a number of records, depending on the implementation. The invention is not limited to any particular training mechanisms, although it is assumed that the data records are used more than once, thus requiring multiple iterations over the dataset.

It is then checked, in an action 508, whether the updated data model has converged according to a predefined convergence condition, basically corresponding to action 4:6 in FIG. 4. If not, the procedure returns to action 504 for executing another iteration of read data records and further training of the model according to actions 504 and 506. Thus, actions 504-508 will typically be repeated multiple times, e.g. according to a preset updating scheme as described above, until the data model is deemed to be converged. When it is eventually determined in action 508 that the updated data model has converged, the converged data model is saved in a suitable data storage or memory that may reside within or outside the database, in a final shown action 510, basically corresponding to action 4:7 in FIG. 4.

A first example of how the invention may be implemented by a database arrangement, will now be described with reference to FIG. 6. In this example, a database 600 comprises a first logic unit 602 which is comprised of one or more UDFs that can be configured to read a dataset with raw data 606 and to perform a training cycle on the read dataset once at a time, which is most likely the case for typical UDFs of today. The database 600 further comprises a second logic unit 604 which in this example is configured to use the query language SQL in communication with the first logic unit 602 and with an external entity A, such as a computer. A flow of exemplary actions for processing data when training a data model in the database 600, are also illustrated as follows.

A first shown action 1 illustrates that the second logic unit 604 receives a trigger from entity A, e.g. a query or command, to execute a model training operation for the dataset according to a given machine learning algorithm or the like, requiring multiple iterations over the dataset 606. This algorithm is naturally dependent on the field of use, which is however outside the scope of this solution.

In a next action 2, unit 604 determines that no model has converged yet and sends a message to the first logic unit 602 in action 3 indicating that no memory address has yet been allocated for the model. This message may simply have an address field with zero this time, while the same message will be used at a later stage in the process for conveying a memory address once it has been allocated in the database.

Next, the first logic unit 602 determines that no model exists yet in action 4, and consequently allocates memory space 608 in the database 600 for maintaining the model during the training operation, in a further action 5. Thereby, the actual training operation may commence and the first logic unit 602 starts to read data records from the dataset 606 and trains the data model in a further action 6a. Unit 602 also stores and updates the resulting data model in memory 608 regularly according to a preset updating scheme in an action 6b, e.g. after each iteration over the total dataset or over a preset part thereof i.e. after iteration over a preset number of data records.

After each update of the model, the first logic unit 602 returns the address where the model is maintained in memory 608, to the second logic unit 604, in action 7. Unit 604 accesses and checks the data model in memory 608 in action 8 and returns to action 2 to determine whether the updated model has converged yet according to a predefined convergence condition. If not, unit 604 sends the message of action 3 to unit 602, this time containing the memory address received in action 7. This message triggers the first logic unit 602 to execute another training cycle of reading data and training the model in action 6a, update the model in memory 608 in action 6b, and return the memory address once more to unit 604 in action 7. It should be noted that after executing actions 1-8 for the first time, it is determined in action 4 that the model exists and action 5 of allocating memory space may be omitted.

This sequence of actions 2-8 will be executed over and over again until it is eventually determined in action 2 that the model has indeed converged. Then, the second logic unit 604 triggers the first logic unit 602 to read the converged data model in action 9 and to save the finalised model by writing the model into a data storage 610 in action 10. Depending on the implementation, the storage 610 may reside inside the database 600 or may be an external data storage to which the model is transmitted. The data model is then available for use in action 11, e.g. as being the subject for various database queries, which is however outside the scope of this invention.

The units and components in the database arrangement 600 may be configured and adapted to provide further optional features and embodiments. In some example embodiments, the first logic unit is further adapted to update the data model in the memory after applying a predetermined number of data records in the training operation according to a preset updating scheme, or after applying substantially all data records in the total dataset in the training operation. The second logic unit may be further adapted to check whether the updated data model has converged after each updating of the data model in the memory.

In another example embodiment, the second logic unit is further adapted to check whether the updated data model has converged by using a memory address of the data model provided by the first logic unit. The first logic unit may comprise at least one User-Defined Function (UDF), and the second logic unit may use SQL in communication with the first logic unit. The training operation may be triggered when the second logic unit receives an SQL query or command from a computer outside the database. The first logic unit may be further adapted to allocate the memory space dynamically to accommodate different versions of the data model of varying size.

Figure 6:
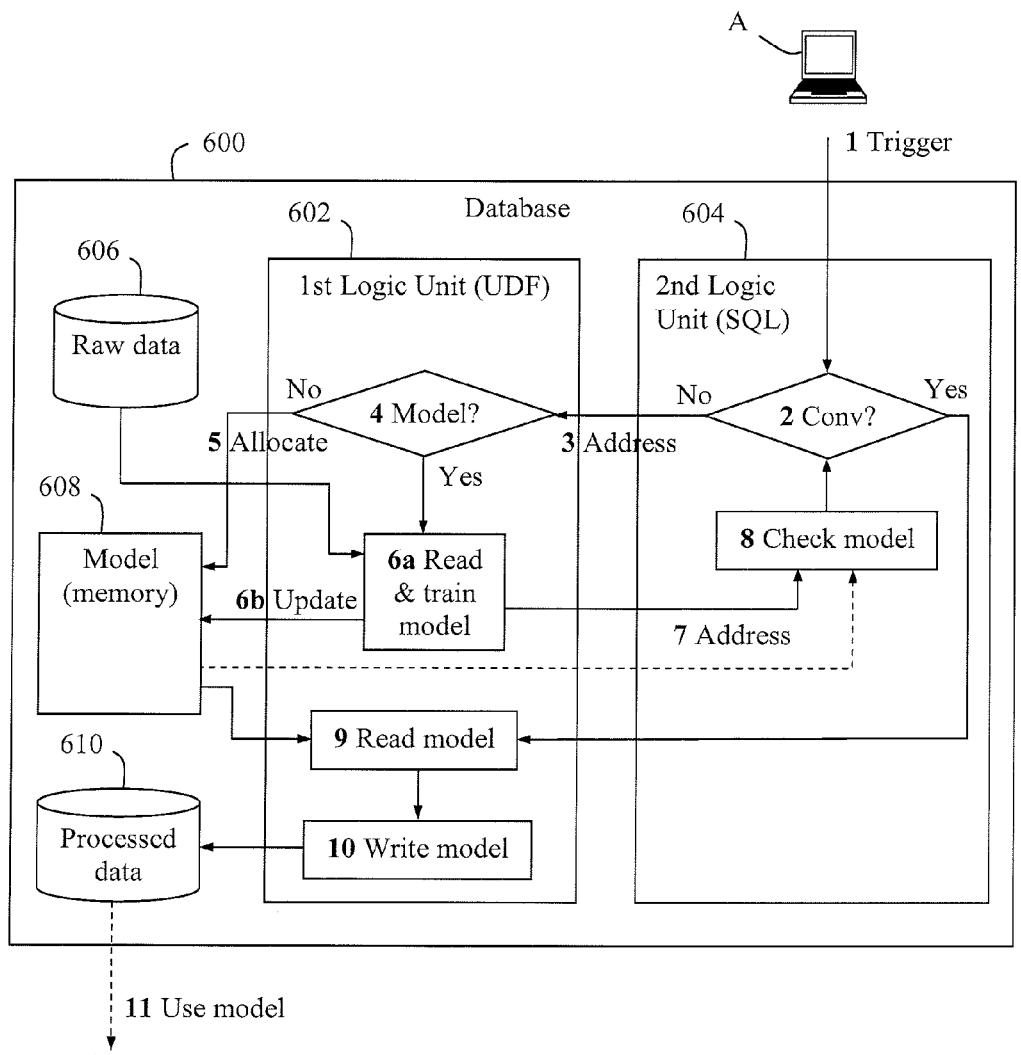
FIG. 6 is a block diagram illustrating how an arrangement in a database can be configured to process data when training a data model, according to further possible embodiments.

It should be noted that FIG. 6 merely illustrates various functional units and components in the database arrangement 600 in a logical sense, although the skilled person is free to implement these functions in practice using suitable software and hardware means. Thus, the invention is generally not limited to the shown structures of the database arrangement 600, while its functional units 602 and 604 may be configured to operate according to the features described for FIGS. 4 and 5 above, where appropriate.

The functional units 602 and 604 described above can be implemented in the database arrangement 600 as program modules of a computer program comprising code means which when run by a processor in the database 600 causes the units 602 and 604 to perform the above-described functions and actions. The processor may be a single CPU (Central processing unit), or could comprise two or more processing units. For example, the processor may include general purpose microprocessors, instruction set processors and/or related chips sets and/or special purpose microprocessors such as ASICs (Application Specific Integrated Circuit).

The computer program may be carried by a computer program product in the database 600 connected to the processor. The computer program product comprises a computer readable medium on which the computer program is stored. For example, the computer program product may be a flash memory, a RAM (Random-access memory), a ROM (Read-Only Memory) or an EEPROM (Electrically Erasable Programmable ROM), and the program modules could in alternative embodiments be distributed on different computer program products in the form of memories within the database 600.

Figure 7:
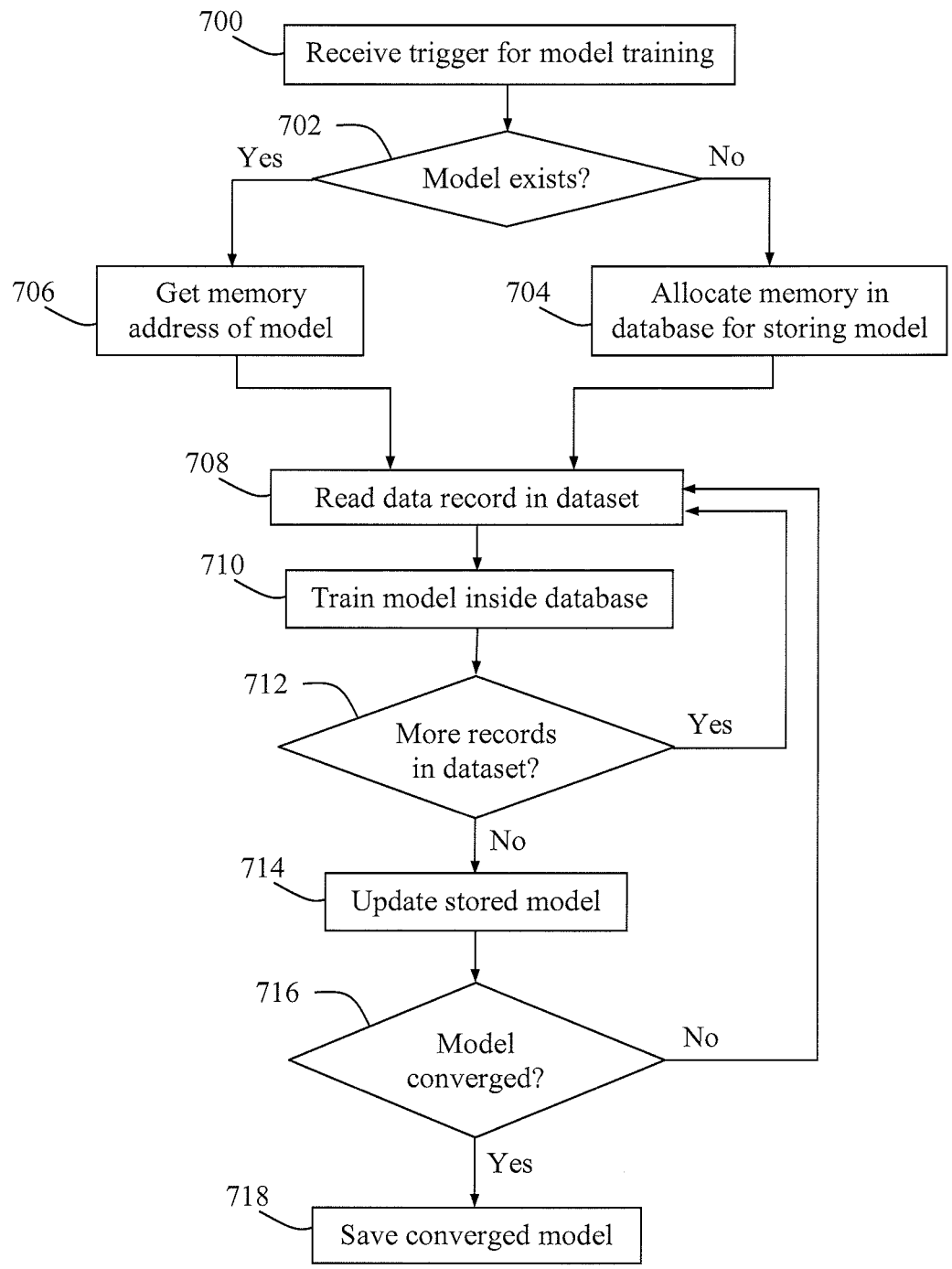
FIG. 7 is a more detailed example flow chart illustrating how data can be processed when training a data model, according to further possible embodiments.

A second example of how the invention may be implemented in practice, will now be described with reference to the flow chart in FIG. 7. In this example, the implementation is described as a flow of actions which may be executed by one or more suitable logic units residing in a database, e.g. involving a UDF part and an SQL part as in the previous example. An initial action 700 is to receive some kind of trigger or request for starting a model training operation on a dataset being maintained in the database, e.g. a query or command from an outside entity.

In a next action 702, it is determined whether a model already exists in the database that can be used for the requested model training. If not, memory space is allocated in the database in action 704 for holding the model, i.e. different updated versions thereof, during the training operation. As mentioned above, the model memory may be a RAM or the equivalent, and the memory space may be allocated on a dynamic basis or as a fixed memory. If it is found in action 702 that a useful model exists in the database, i.e. there is memory space already allocated for the model, the address of that memory is obtained in an action 706.

Then, the actual training operation can begin by reading a data record from the dataset, in an action 708 and training the data model by means of the read data record in an action 710. In this example, the model is thus continuously trained for each read data record, although would also be possible to train the model a regular intervals after reading any preset number of data records.

If it is found in action 712 that there are at least one further data record in the dataset, the next data record is read and the model is accordingly trained, thus repeating actions 708-712. Once it is found in action 712 that there are no more data records in the dataset to read, i.e. the dataset or a preset part thereof has been read and used for model training, the data model maintained in the allocated memory is updated in an action 714.

Although not shown in this example, a UDF part in the database may at this point, after each training cycle and updating of the model, return the memory address of the model to an SQL part in the database, to indicate that the data model has been updated and that a new convergence check is motivated and can be performed, basically in the manner described for FIG. 6 above.

It is then determined in action 716 whether the updated data model has converged or not according to a predefined convergence condition, which may be done by the SQL part as said above. If not converged, the process returns to action 708 for executing another iteration over the dataset, which is repeated until the model has indeed converged. In that case, the converged model is saved in a final shown action 718 for later use, e.g. by writing the model into a memory in the database or by saving it in an external data storage.

Some advantages that may be achieved with this novel procedure and arrangement for training a data model by means of a machine learning algorithm when substantial datasets are involved, as compared to conventional solutions, may include:

1) Significantly reduced time for the model training as compared to fetching the dataset to an external application or entity. Tests have indicated that the time for obtaining the data records can be reduced by 80-90% when reading them inside the database instead, resulting in shorter total computation time.

2) Significantly reduced requirements for storing capacity as compared to holding a complete dataset, since updated versions of the data model are much smaller in size than a complete dataset. A conventional RAM would most likely be sufficient for maintaining the data model in the database during the training operation. Further, no powerful applications are needed outside the database.

3) It is possible to employ the already developed concept of UDF or similar for implementing the training operation within the database, which is however expected to be capable of iterating over a dataset just once at a time. This can be overcome by implementing another logic part in the database that performs the convergence checks and repeatedly triggers the UDF to execute another iteration over the dataset in the training operation, until the model is deemed to be converged. As a result, the solution is associated with limited complexity and costs.

4) It is also possible to use the common query language SQL or similar for communication between the logic units or parts within the database.

5) Security and integrity are improved since the training operation does not need to use data records outside the database which are thus not exposed for interception.

While the invention has been described with reference to specific exemplary embodiments, the description is generally only intended to illustrate the inventive concept and should not be taken as limiting the scope of the invention. The invention is defined by the appended claims.

The invention claimed is:

1. A method of processing data during a training operation to train a data model involving multiple iterations of data records in a dataset stored in a database, the method comprising:
   allocating memory space in the database for maintaining the data model during the training operation while the data model is trained by multiple iterations of data records in a dataset stored in the database,
   reading said data records in the dataset directly from the database for each iteration,
   training the data model inside the database by repeatedly applying the read data records in the training operation to successively update the data model to generate an updated data model in said memory accordingly,
   checking whether the updated data model has converged according to a predefined convergence condition, and
   saving the updated data model once the updated data model has converged.

2. A method according to claim 1, wherein the data model is updated in said memory after applying a predetermined number of data records in the training operation according to a preset updating scheme.

3. A method according to claim 1, wherein the data model is updated in said memory after applying substantially all data records in the total dataset in the training operation.

4. A method according to claim 1, wherein the checking whether the updated data model has converged is performed after each successive update of the data model in said memory.

5. A method according to claim 1, wherein a first logic unit configured inside the database performs the reading of said data records and the training of the data model, and a second logic unit performs the checking whether the updated data model has converged by using a memory address of the data model provided by the first logic unit.

6. A method according to claim 5, wherein the first logic unit comprises at least one User-Defined Function (UDF) used for the training operation.

7. A method according to claim 5 further comprising obtaining by the second logic unit the memory address of the data model from the first logic unit using Structured Query Language (SQL).

8. A method according to claim 7, further comprising triggering carrying out of the training operation in response to the second logic unit receiving an SQL query or command from a computer outside the database.

9. A method according to claim 5,
wherein the first logic unit comprises at least one User-Defined Function (UDF) used for the training operation,
wherein the first logic unit is configured to receive a message from the second logic unit and perform one iteration of the reading and the training in response to the receiving a message, and
wherein the second logic unit is configured to iteratively send a message to the first logic unit and obtain the memory address of the data model from the first logic unit using Structured Query Language (SQL) until the updated data model has converged.

10. A method according to claim 1, wherein the allocating memory space comprises dynamically varying the allocated memory space responsive to size of the updated data model.

11. An arrangement in a database configured to process data during a training operation to train a data model, comprising:
a first logic unit adapted to allocate memory space in the database for maintaining the data model during the training operation while the data model is trained by multiple iterations of data records in a dataset stored in the database, to read said data records in the dataset directly from the database for each iteration, and to train the data model inside the database by repeatedly applying the read data records in the training operation to successively update the data model to generate an updated data model in said memory accordingly, and
a second logic unit adapted to check whether the updated data model has converged according to a predefined convergence condition,
wherein the first logic unit is further adapted to save the updated data model once the updated data model has converged.

12. An arrangement according to claim 11, wherein the first logic unit is further adapted to update the data model in said memory after applying a predetermined number of data records in the training operation according to a preset updating scheme.

13. An arrangement according to claim 11, wherein the first logic unit is further adapted to update the data model in said memory after applying substantially all data records in the total dataset in the training operation.

14. An arrangement according to claim 11, wherein the second logic unit is further adapted to check whether the updated data model has converged after each updating by the first logic unit of the data model in said memory.

15. An arrangement according to claim 11, wherein the second logic unit is further adapted to check whether the updated data model has converged by using a memory address of the data model provided by the first logic unit.

16. An arrangement according to claim 15, wherein the first logic unit uses at least one User-Defined Function (UDF) to perform the training operation.

17. An arrangement according to claim 15, wherein the second logic unit obtains the memory address of the data model from the first logic unit using Structured Query Language (SQL).

18. An arrangement according to claim 17, wherein the training operation is triggered in response to the second logic unit receiving an SQL query or command from a computer outside the database.

19. An arrangement according to claim 11, wherein the first logic unit is further adapted to dynamically allocate said memory space responsive to size of the updated data model.

20. An arrangement according to claim 11,
wherein the first logic unit uses at least one User-Defined Function (UDF) to perform the training operation,
wherein the first logic unit is adapted to receive a message from the second logic unit and perform one iteration of the reading and the training in response to the receiving a message, and
wherein the second logic unit is adapted to iteratively send a message to the first logic unit and obtain the memory address of the data model from the first logic unit using Structured Query Language (SQL) until the updated data model has converged.

* * * * *